(12) United States Patent
Van Valkenburg, III

(10) Patent No.: US 11,490,753 B2
(45) Date of Patent: *Nov. 8, 2022

(54) SECURING, ANALYZING, AND TRANSMITTING NOTIFICATION AND DELIVERY OF MAIL, MAIL RECEIPT, AND MAILBOX TAMPERING

(71) Applicant: The ADT Security Corporation, Boca Raton, FL (US)

(72) Inventor: Robert Arthur Van Valkenburg, III, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,787

(22) Filed: Apr. 22, 2021

(65) Prior Publication Data

US 2021/0235913 A1 Aug. 5, 2021

Related U.S. Application Data

(63) Continuation of application No. 16/688,455, filed on Nov. 19, 2019, now Pat. No. 10,986,950.
(Continued)

(51) Int. Cl.
*H04N 7/18* (2006.01)
*A47G 29/12* (2006.01)
(Continued)

(52) U.S. Cl.
CPC .......... *A47G 29/1214* (2013.01); *G08B 3/10* (2013.01); *G08B 21/22* (2013.01); *H04N 5/247* (2013.01);
(Continued)

(58) Field of Classification Search
CPC ...... A47G 29/1214; A47G 2029/12105; A47G 2029/1257; A47G 29/1225;
(Continued)

(56) References Cited

U.S. PATENT DOCUMENTS 4,868,543 A 9/1989 Binkley
7,486,948 B1 2/2009 Vergon
(Continued)

*Primary Examiner* — Michael Lee
(74) *Attorney, Agent, or Firm* — Christopher & Weisberg, P.A.

(57) ABSTRACT

A method, system and apparatus are disclosed. In one or more embodiments, a system for monitoring a mailbox is provided. The system may include a mailbox device including at least one sensor, such as a video camera, for detecting movement, and a mailbox communication interface configured to communicate information including sensor information generated by the at least one sensor. The system may further include a premises device including a premises communication interface configured to receive the sensor information from the mailbox device and processing circuitry configured to determine whether a mailbox event has occurred and trigger at least one alert if a mailbox event occurred. The system may further provide notification of the event to an authorized entity via mobile device, voice assistant, etc. An access control unit may be used to limit access to the mailbox to authorized individuals.

18 Claims, 12 Drawing Sheets

Related U.S. Application Data

(60) Provisional application No. 62/771,724, filed on Nov. 27, 2018.

(51) Int. Cl.

| | | |
|---|---|---|
| *G08B 3/10* | (2006.01) | |
| *G08B 21/22* | (2006.01) | |
| *H04N 5/247* | (2006.01) | |
| *H04W 4/02* | (2018.01) | |

(52) U.S. Cl.
CPC ............. *H04N 7/181* (2013.01); *H04N 7/188* (2013.01); *H04W 4/023* (2013.01); *A47G 2029/12105* (2017.08)

(58) Field of Classification Search
CPC .......... A47G 2029/1226; A47G 29/124; G08B 3/10; G08B 21/22; H04N 5/247; H04N 7/181; H04N 7/188; H04N 5/23222; H04W 4/023; H04W 4/38; H04W 4/30; H04W 4/02; H04W 4/027; H04W 4/80
USPC ........................................................ 348/154
See application file for complete search history.

(56) References Cited

U.S. PATENT DOCUMENTS

| | | | |
|---|---|---|---|
| 9,609,973 | B1 | 4/2017 | Pleasant |
| 10,016,083 | B1* | 7/2018 | Atieh ................. G06V 40/1365 |
| 10,986,950 | B2* | 4/2021 | Van Valkenburg, III .................... H04N 7/181 |
| 2003/0085631 | A1 | 5/2003 | Cech et al. |
| 2005/0122220 | A1 | 6/2005 | Staples |
| 2008/0040243 | A1 | 2/2008 | Chang et al. |
| 2008/0290151 | A1 | 11/2008 | Usmani |
| 2010/0001861 | A1 | 1/2010 | Davis |
| 2012/0053732 | A1 | 3/2012 | Park |
| 2013/0147626 | A1* | 6/2013 | Hammoud ............. G08B 13/22 340/569 |
| 2016/0241660 | A1 | 8/2016 | Nhu |
| 2017/0326598 | A1 | 11/2017 | Chelian et al. |
| 2018/0008076 | A1 | 1/2018 | Mitra et al. |
| 2018/0206661 | A1 | 7/2018 | Zhang et al. |
| 2018/0374332 | A1 | 12/2018 | Waclawik et al. |
| 2019/0307278 | A1 | 10/2019 | Henneli |
| 2019/0318557 | A1 | 10/2019 | Amuduri |
| 2020/0001816 | A1 | 1/2020 | Ducardonnet et al. |
| 2020/0146488 | A1 | 5/2020 | Bradish |

\* cited by examiner

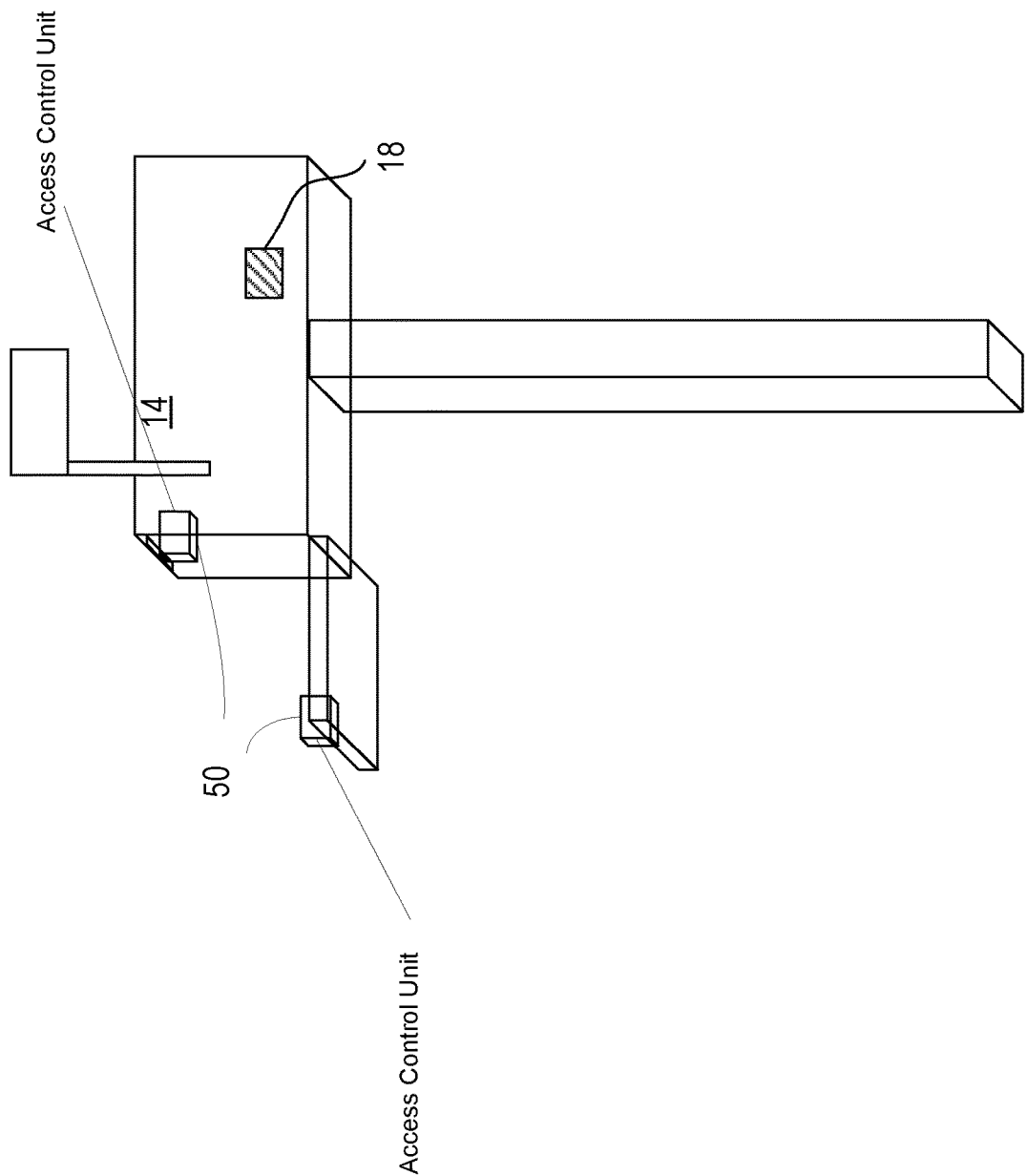

SECURING, ANALYZING, AND TRANSMITTING NOTIFICATION AND DELIVERY OF MAIL, MAIL RECEIPT, AND MAILBOX TAMPERING

CROSS-REFERENCE TO RELATED APPLICATION

This application is a continuation of and claims priority to U.S. Utility patent application Ser. No. 16/688,455, filed on Nov. 19, 2019, which claims priority to U.S. Provisional Patent Application Ser. No. 62/771,724, filed Nov. 27, 2018, entitled SENDING, RECEIVING, RECORDING, AND ANALYZING NOTIFICATION AND EVIDENCE OF MAIL DELIVERY, MAIL RECEIPT, AND MAILBOX TAMPERING, the entireties of both which are incorporated herein by reference.

TECHNICAL FIELD

The present invention relates to monitoring systems, and in particular to mailbox surveillance.

BACKGROUND

The mailbox delivery notification industry is a developing industry. Existing systems for "secure delivery" of mail lack basic features and functionality. Mail delivered into a mailbox should be safe and secure, but that is not always the case. In fact, there is a United States federal law that prohibits people from opening another's mail generally stating that: mailboxes are considered federal property, and it is against the law to vandalize a mailbox or to open any mail deposited in it before those items are delivered to the addressee. However, there are no specific rules about opening someone's mailbox when you don't intend to open or destroy the letters. Regardless of the law, each year, there are numerous cases of mail theft that occur, costing victims time, money, and loss of property.

In particular, the U.S. Postal Service has stated that while the vast majority of the mail it delivers arrives intact, thieves persist in their efforts to steal it. Postal inspectors have teamed with the U.S. Postal Service to devise new security strategies that thwart thieves, yet some of these strategies fall short.

Further, as consumers continue to shift purchases from brick-and-mortar retail to e-commerce, delivery of packages on consumers' doorsteps and inside their mailboxes is expected to increase in tandem. Some have predicted a 15% growth in sales and total value for online shopping, while offline may only have a 4.5% increase, where 51% of all consumers, 67% of Millennials, and 56% of Generation X people prefer shopping online rather than in-store.

There are many types of information included on mail/packages that are valuable, private and/or sensitive: bank account numbers, checks, personal identification numbers, prescription pills, packages, etc. Each of these could cause substantial harm to an individual if they got into the wrong hands. For example, a criminal gathering personal information from a mailbox could potentially steal someone's identity. Or, a criminal could steal a check from a mailbox, causing the victim to be out of money, while also causing them additional work as they try to sort out the problem with their bank, insurance company, etc. In all these cases, the harm could be severe and expensive to the victim, in time, money, and personal damage.

Several companies have devised solutions to address the problem of mail theft. Some of these existing systems use a sensor, like the traditional door/window sensor in a burglar alarm, to detect when a mailbox has been opened, and then communicate the signal, either wired or wirelessly, to a receiver, which translates the signal into an understandable format (i.e., LED light, auditory sound, etc.). In some of these existing systems, the opening and closing of the mailbox may trigger an audible sound or spoken voice inside the home through a dedicated speaker. In other cases, some existing systems have taken a traditional wireless door/window sensor and tried to make it work as a "smart delivery notification" system. The downside of this setup may be (1) the sensor has limited range (since it was designed to operate near the base station), (2) the system sends notification any time the mailbox is opened or closed as there is no intelligence tied to the mailbox alert system, causing the system to send many potentially unimportant alerts to the user, and (3) there may be no video evidence if a crime is committed.

Furthermore, with existing solutions, users only receive alerts of their mailbox opening or closing through an audible sound or visual cue inside their home, or on the mailbox. Communication of the event is confined within the home and there is no way to receive mobile alerts of the event that took place at the mailbox (without using a wireless door/window sensor beyond its intended use). Additionally, many of the existing systems may require the user to purchase an additional speaker for audible notification. Today, there are many consumers who have personal voice assistant speakers within their homes (Amazon Echo, Google Home, Apple HomePod, etc.). The existing mailbox notification systems do not integrate with any of the personal voice assistant speakers available in the market.

SUMMARY

There are currently no solutions in the market that tie together a video camera with a mailbox open/close sensor. As such, while users might receive a notification that their mailbox has been opened, they might not have video evidence of who took the mail/package, making identification of burglars much more difficult. Finally, there is no existing solution that ties together artificial intelligence with mailbox alerts to reduce the number of irrelevant alerts, which may cause a bad user experience and potential user apathy in the case where a notable event does occur.

Some existing companies are investing heavily in video doorbell solutions and are beginning to provide neighborhood watch programs based on these video doorbells, which allow neighbors to share videos with one another. A mailbox notification system, like the one described herein, may complement these existing video doorbell systems, and neighborhood watch programs, since it could provide protection against package theft, as well as video evidence in case a crime has been committed.

One or more embodiments described herein help make a traditional mailbox "smart", giving the user improved awareness over their personal property, so they can make more informed decisions about their mailbox contents and as well as improve their mailbox security.

The Smart Mailbox Notification system described herein ties together one or more sensors (e.g., door/window sensor) and a long-range radio (e.g., transmitter, receiver and/or transceiver), which can communicate with a variety of systems, including home security and automation systems, personal voice assistant speakers, lighting systems, etc.

There may also be artificial intelligence built into the system which helps users by improving the content of notifications and reducing the number of irrelevant notifications.

Some embodiments advantageously provide methods, systems, and apparatuses for mailbox surveillance. In one or more embodiments, a system for monitoring a mailbox is provided. The system includes a mailbox device including at least one sensor for detecting movement, and a mailbox communication interface configured to communicate information including sensor information generated by the at least one sensor. The system includes a premises device including a premises communication interface configured to receive the sensor information from the mailbox device, and processing circuitry configured to determine whether a mailbox event has occurred, and trigger at least one alert if the mailbox event occurred.

In one or more embodiments, the mailbox device further includes at least one video capture device, the information communicated to the premises device includes video captured by the video capture device. In one or more embodiments, the at least one video capture device includes a first video capture device configured to capture video of the exterior of the mailbox and a second video capture device configured to capture video of the interior of the mailbox. In one or more embodiments, the mailbox communication interface is further configured to receive wireless signals for identifying a person proximate the mailbox.

In one or more embodiments, wireless signals are one selected from a group of near field communication signals, global positioning signals and BLUETOOTH signals. In one or more embodiments, the premises device is configured to integrate with at least one electronic personal voice assistant for providing an audible indication of the at least one alert. In one or more embodiments, the determining whether the mailbox event occurred includes analyzing a frequency and timing of mailbox openings and closings detected by the at least one sensor.

According to one aspect of the disclosure, a premises security system for monitoring a mailbox is provided. The premises security system comprises a mailbox device including at least one sensor, each of the at least one sensor configured to generate corresponding sensor information, a mailbox communication interface configured to communicate information including the sensor information generated by the at least one sensor and a premises device in communication with the mailbox device. The premises device includes a premises communication interface configured to receive the sensor information from the mailbox device and processing circuitry configured to determine, based on mailbox alert criteria, whether a mailbox event has occurred and trigger at least one alert if the mailbox event occurred.

According to one or more embodiments of this aspect, the mailbox device further includes at least one video capture device, the sensor information communicated to the premises device including video captured by the video capture device.

According to one or more embodiments of this aspect, the at least one video capture device includes a first video capture device configured to capture video of the exterior of the mailbox and a second video capture device configured to capture video of the interior of the mailbox. According to one or more embodiments of this aspect, the mailbox communication interface is further configured to receive wireless signals for identifying a person proximate to the mailbox. According to one or more embodiments of this aspect, the wireless signals are at least one of near field communication signals, global positioning signals and BLUETOOTH signals.

According to one or more embodiments of this aspect, the premises device is configured to integrate with at least an electronic personal voice assistant for providing an audible indication of the at least one alert. According to one or more embodiments of this aspect, determining whether the mailbox event occurred includes analyzing a frequency and timing of mailbox openings and closings detected by the at least one sensor. According to one or more embodiments of this aspect, the mailbox device further comprises an access control unit affixed to the mailbox which limits access to the mailbox.

According to one aspect of the disclosure, a mailbox device for monitoring a mailbox is provided. The mailbox device comprises at least one sensor, the at least one sensor configured to detect opening and closing of the mailbox and generate corresponding sensor information, and at least one video capture device configured to capture video in a response to the sensor information of the at least one sensor.

According to one or more embodiments of this aspect, the mailbox device further comprises a mailbox communication interface configured to communicate information including the sensor information generated by the at least one sensor. According to one or more embodiments of this aspect, the mailbox device further comprises processing circuitry in communication with at least one of the at least one sensor and at least one video capture device. The processing circuitry is configured to determine whether a mailbox event has occurred by analyzing a frequency and timing of mailbox openings and closings detected by the at least one sensor; and trigger at least one alert if the mailbox event occurred.

According to one or more embodiments of this aspect, the at least one video capture device includes a first video capture device configured to capture video of the exterior of the mailbox and a second video capture device configured to capture video of the interior of the mailbox. According to one or more embodiments of this aspect, the mailbox communication interface is further configured to receive wireless signals for identifying a person proximate to the mailbox, the wireless signals including at least one of near field communication signals, global positioning signals and BLUETOOTH signals. According to one or more embodiments of this aspect, the mailbox device is configured to integrate with at least one electronic personal voice assistant for providing an audible indication of the at least one alert. According to one or more embodiments of this aspect, the mailbox device further comprises an access control unit affixed to the mailbox which limits access to the mailbox.

According to one aspect of the disclosure, a method of monitoring a mailbox is provided. The method comprises detecting movement in proximity to the mailbox, communicating an indication of the detected movement to a premises device, determining if a mailbox event has occurred based upon the indication of the detected movement and triggering at least one alert if a mailbox event occurred.

According to one or more embodiments of this aspect, the method further comprises detecting opening and closing of the mailbox and determining if a mailbox event has occurred based upon the detected opening and closing of the mailbox. According to one or more embodiments of this aspect, the indication further comprises video captured by the mailbox device. According to one or more embodiments of this aspect, the indication further comprises captured video of the exterior of the mailbox and captured video of the interior of the mailbox.

According to one or more embodiments of this aspect, the method further comprises identifying a person proximate to the mailbox. According to one or more embodiments of this aspect, identifying a person proximate to the mailbox further comprises receiving a wireless signal that identifies the person proximate to the mailbox. According to one or more embodiments of this aspect, the method further comprises sending an indication to at least one electronic personal voice assistant to provide an audible indication of the at least one alert. According to one or more embodiments of this aspect, the method further comprises limiting access to an interior of the mailbox to authorized users.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 12 is a diagram of another example embodiment of the mailbox and mailbox device having an access control unit according to some embodiments of the present invention.

DETAILED DESCRIPTION

Figure 1:
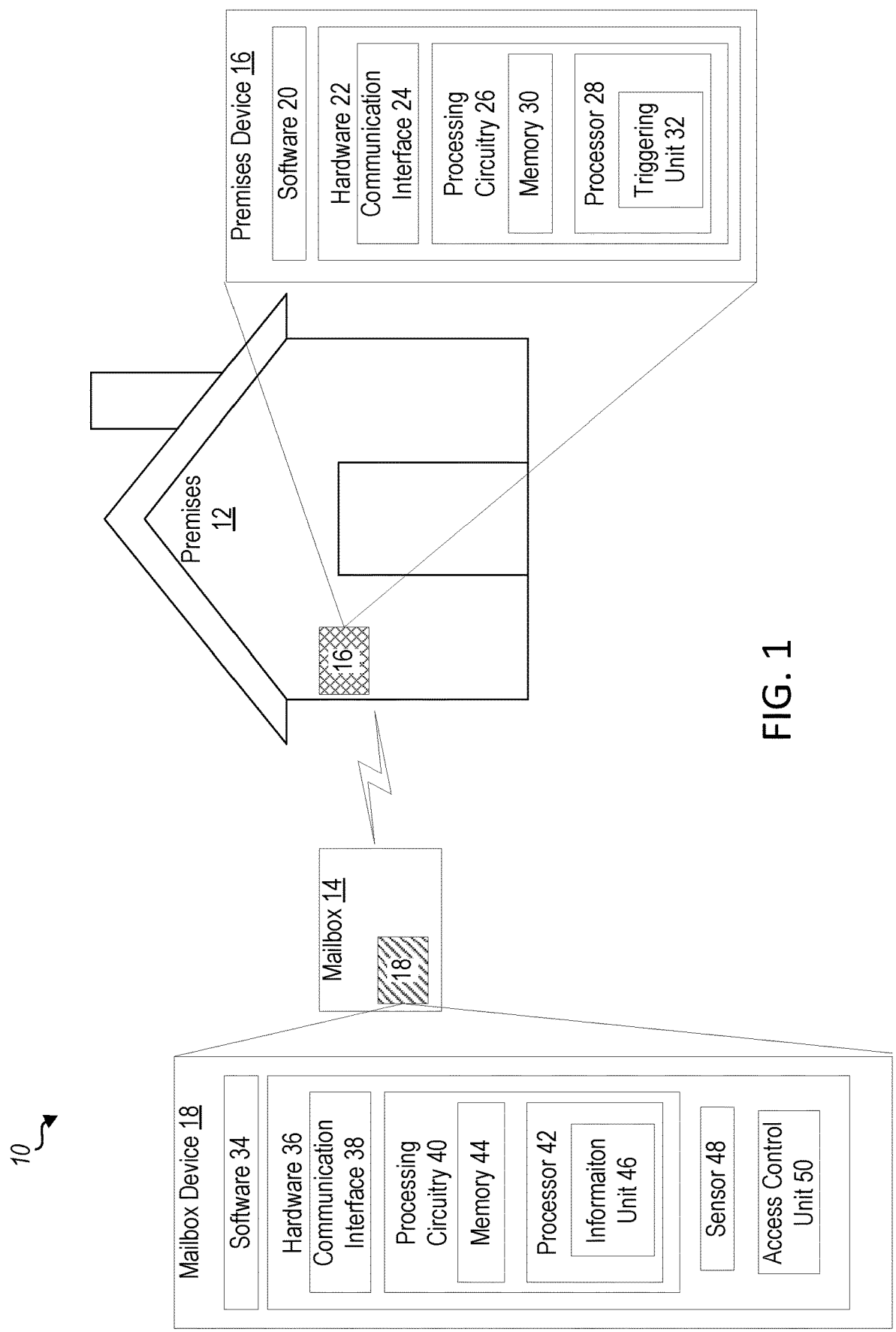
FIG. 1 is a schematic diagram of an exemplary system according to the principles in the present invention.

Before describing in detail exemplary embodiments, it is noted that the embodiments reside primarily in combinations of apparatus components and processing steps related to mailbox surveillance and/or monitoring. Accordingly, components have been represented where appropriate by conventional symbols in the drawings, showing only those specific details that are pertinent to understanding the embodiments so as not to obscure the invention with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations in the manner of achieving the electrical and data communication are possible.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a system for mailbox alert determination and notification, generally referred to as system 10. System 10 includes one or more premises 12 and one or more mailboxes 14. In one or more embodiments, mailbox 14 may generally refer to a structure that is configured to at least temporarily store one or more articles, packages, etc. Premises 12 includes premises device 16, and mailbox 14 includes mailbox device 18.

Premises device 16 includes software 20 that may be executable by hardware 22 as described herein. Hardware 22 may include a communication interface 24 that is configured to communicate with mailbox 14 and/or one or more other systems (e.g., home security and automation systems, personal voice assistant speakers, lighting systems, etc. which may be located at the premises 12) via one or more wireless communication protocols. In one or more embodiments, the communications includes data, instructions, etc. initiated by the mailbox 14 and/or premises device 16.

In the embodiment shown, the hardware 22 of the premises device 16 further includes processing circuitry 26. The processing circuitry 26 may include a processor 28 and a memory 30. In particular, in addition to or instead of a processor, such as a central processing unit, and memory, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the premises device 16 further has software 20 stored internally in, for example, memory 30, or stored in external memory (e.g., database, storage array, network storage device, etc.) accessible by premises device 16 via an external connection. The software 20 may be executable by the processing circuitry 26. The processing circuitry 26 may be configured to control any of the methods and/or processes described herein and/or to cause such methods, and/or processes to be performed, e.g., by premises device 16. Processor 28 corresponds to one or more processors 28 for performing premises device 16 functions described herein. The memory 30 is configured to store data, programmatic software code and/or other information described herein. In some embodiments, the software 20 may include instructions that, when executed by the processor 28 and/or processing circuitry 26, causes the processor 28 and/or processing circuitry 26 to perform the processes described herein with respect to premises device 16. For example, processing circuitry 26 of the premises device 16 may include triggering unit 32 configured to trigger one or more alerts as described herein.

Mailbox device 18 includes software 34 that may be executable by hardware as described herein. Hardware 36 includes communication interface 38 that is configured to communicate with premises device 16 via one or more wireless communication protocols (e.g., long range communication protocols). In one or more embodiments, the communications includes data, instructions, etc. initiated by the mailbox 14 and/or premises device 16.

In the embodiment shown, the hardware 36 of the mailbox device 18 further includes processing circuitry 40. The processing circuitry 40 may include a processor 42 and a memory 44. In particular, in addition to or instead of a processor, such as a central processing unit, and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 42 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the mailbox device 18 further has software 34 stored internally in, for example, memory 44, or stored in external memory (e.g., database, storage array, network storage device, etc.) accessible by mailbox device 18 via an external connection. The software 34 may be executable by the processing circuitry 40. The processing circuitry 40 may be configured to control any of the methods and/or processes described herein and/or to cause such methods, and/or processes to be performed, e.g., by mailbox device 18. Processor 42 corresponds to one or more processors 42 for performing mailbox device 18 functions described herein. The memory 44 is configured to store data, programmatic software code and/or other information described herein. In some embodiments, the software 34 may include instructions that, when executed by the processor 42 and/or processing circuitry 40, causes the processor 42 and/or processing circuitry 40 to perform the processes described herein with respect to mailbox device 18. For example, processing circuitry 40 of the mailbox device 18 may include information unit 46 configured to communicate information related to one or more sensors 48 as described herein. Sensors 48 may include one or more of motion sensors, video sensors (e.g., video capture devices), infrared sensors, etc. In one or more embodiments, one or more sensors 48 are mounted on one or more portions of a door of the mailbox 14. In one or embodiments, one or more sensors 48 are mounted on one or more portions of the mailbox 14 such as mounted at least on the top portion of the mailbox 14. In one or more embodiments, one or more sensors 48 are mounted, i.e., removably affixed, to one or more other portions of the mailbox 14 and/or proximate the mailbox 14 such as to provide one or more views of the mailbox 14 and/or inside the mailbox 14.

In the embodiment shown, the hardware 36 of the mailbox device 18 further includes access control unit 50. Access control unit 50 may include a locking mechanism that is selectively controlled using inputs from software 34, communication interface 38, sensor 48 and/or processing circuitry 40. The access control unit 50 may be configured to limit access to the mailbox to authorized entities as described herein.

Although FIG. 1 shows various "units" such as triggering unit 32, and information unit 46 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
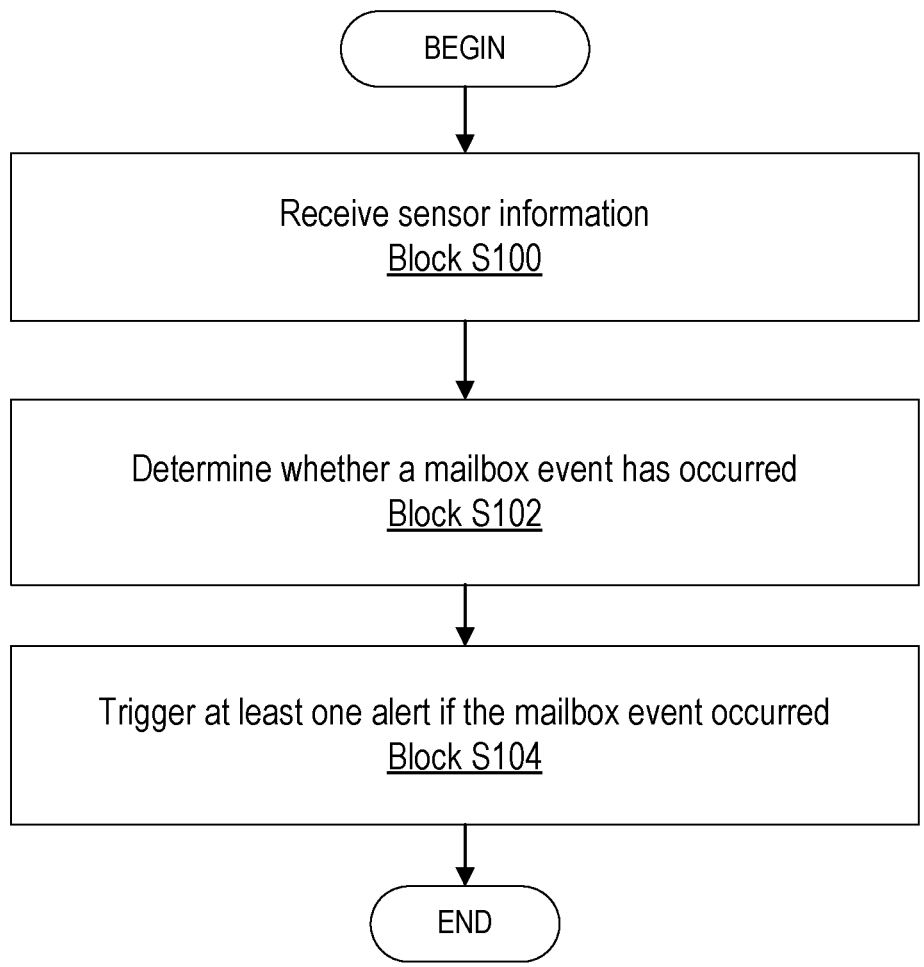
FIG. 2 is a flowchart illustrating an exemplary method according to some embodiments of the present invention.

FIG. 2 is a flowchart of an exemplary process in a premises device 16 in accordance with some embodiments of the present invention. One or more Blocks and/or functions performed by premises device 16 may be performed by one or more elements of premises device 16 such as by triggering unit 32 in processing circuitry 26, processor 28, communication interface 24, etc. In one or more embodiments, premises device 16 such as via one or more of processing circuitry 26, processor 28 and communication interface 24 is configured to at least receive (Block S100) sensor information. In one or more embodiments, premises device 16 such as via one or more of processing circuitry 26, processor 28 and communication interface 24 is configured to at least determine (Block S102) whether a mailbox event has occurred. In one or more embodiments, premises device 16 such as via one or more of processing circuitry 26, processor 28 and communication interface 24 is configured to trigger (Block S104) at least one alert if the mailbox event occurred. In one or more embodiments the determination whether a mailbox event occurred is based on a predefined criteria or criteria and/or predefined one or more rules that may be used to evaluate and/or analyze (e.g., compare sensor information with a criteria) the sensor information.

In one or more embodiments, the mailbox device 18 further includes at least one video capture device (such as at least one sensor 48) where the information communicated to the premises device 16 includes video captured by the video capture device. In one or more embodiments, the at least one video capture device includes a first video capture device configured to capture video of the exterior of the mailbox 14 and a second video capture device configured to capture video of the interior of the mailbox 14 where the delivered articles (e.g., mail) are placed.

In one or more embodiments, the mailbox communication interface 24 is further configured to receive wireless signals for identifying a person proximate the mailbox 14. In one or more embodiments, the wireless signals are one selected from a group of near field communication signals, global positioning signals and BLUETOOTH signals. In one or more embodiments, the premises device 16 is configured to integrate with at least one electronic personal voice assistant for providing an audible indication of the at least one alert. The personal voice assistant may be located in and/or proximate premises 12. In one or more embodiments, determining whether the mailbox event occurred includes analyzing a frequency and timing of mailbox openings and closings detected by the at least one sensor 48.

Figure 3:
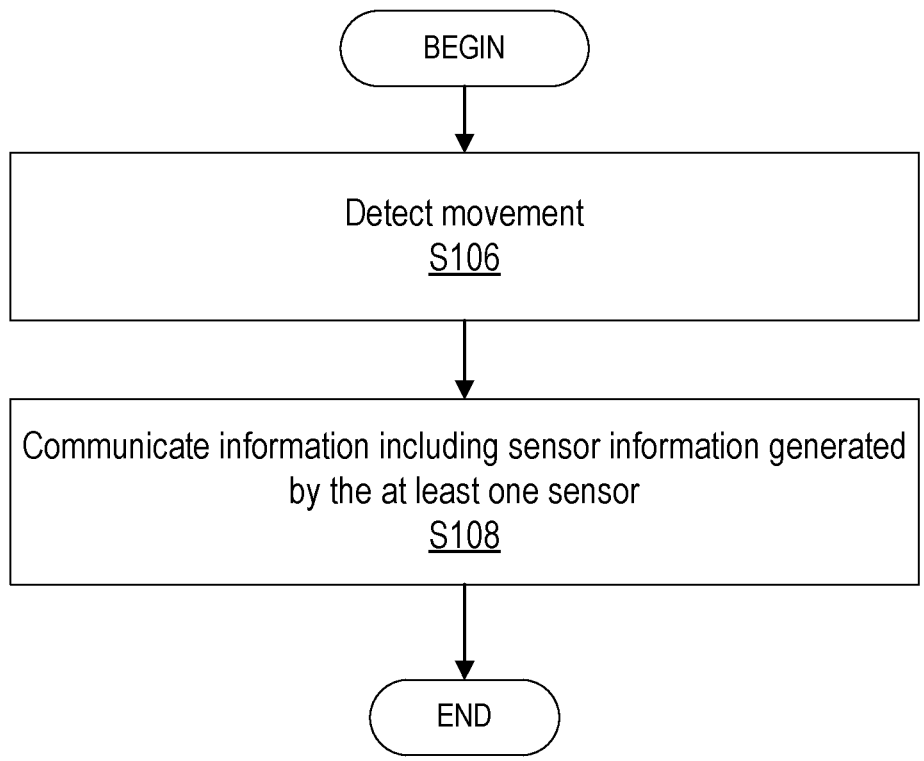
FIG. 3 is a flowchart illustrating another exemplary method according to some embodiments of the present invention.

FIG. 3 is a flowchart of an exemplary process in a mailbox device 18 according to some embodiments of the present invention. One or more Blocks and/or functions performed by mailbox device 18 may be performed by one or more elements of mailbox device 18 such as by information unit 46 in processing circuitry 40, processor 42, communication interface 38, access control unit 50, etc. In one or more embodiments, mailbox device 18 such as via one or more of processing circuitry 40, processor 42 and communication interface 38 is configured to at least detect (Block S106) movement such as using one or more sensors 48. In one or more embodiments, mailbox device 18 such as via one or more of processing circuitry 40, processor 42 and communication interface 38 is configured to communicate (Block S108) information including sensor information generated by the at least one sensor 48.

Figure 4:
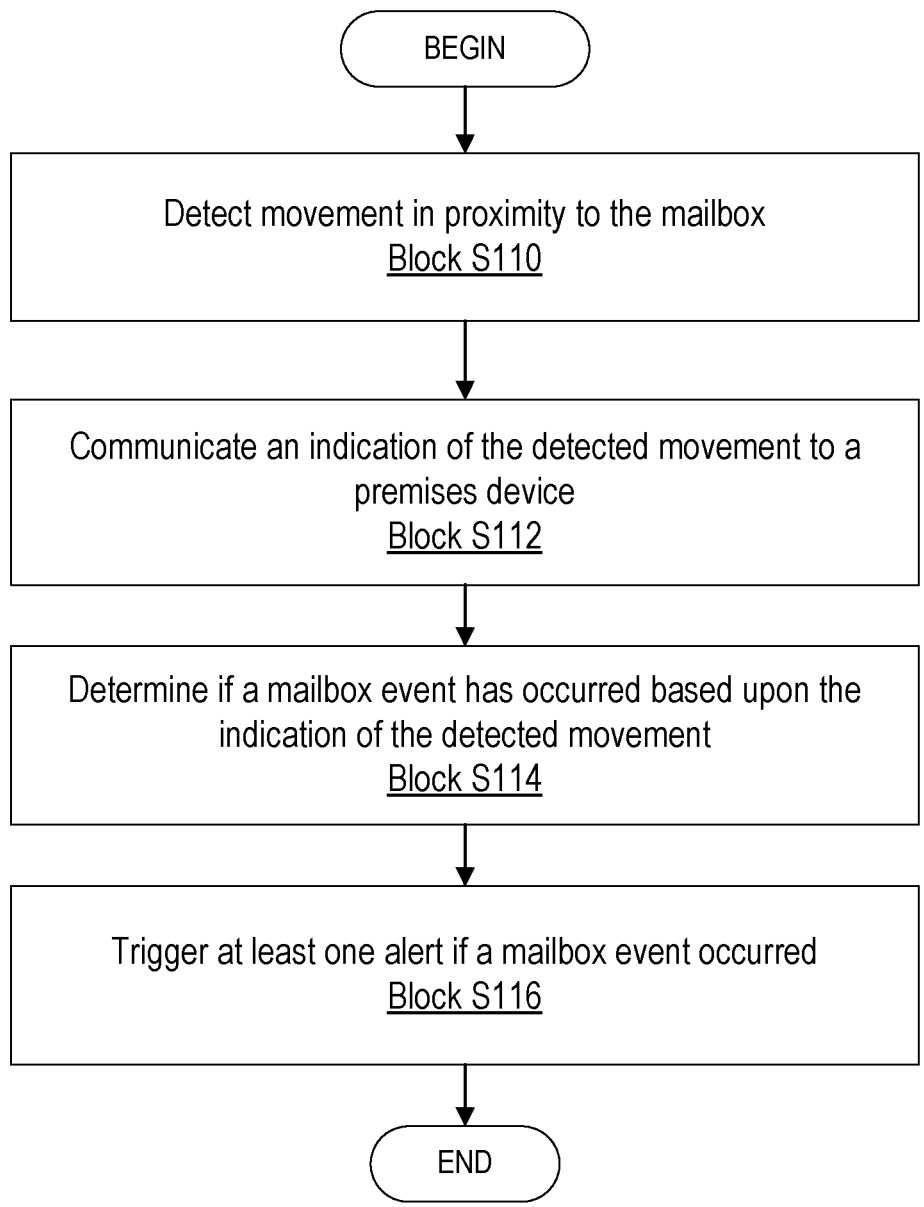
FIG. 4 is a flowchart illustrating another exemplary method according to some embodiments of the present invention.

FIG. 4 is a flowchart illustrating another exemplary method according to some embodiments of the present invention. One or more Blocks and/or functions of the method of FIG. 4 may be performed by one or more elements of premises device 16 and/or mailbox device 18 such as by triggering unit 32 in processing circuitry 26, processor 28, communication interface 24, information unit 46 in processing circuitry 40, processor 42, communication interface 38, access control unit 50, etc. In one or more embodiments, premises device 16 and/or mailbox device 18 such as via one or more of triggering unit 32 in processing circuitry 26, processor 28, communication interface 24, information unit 46 in processing circuitry 40, processor 42, communication interface 38, and access control unit 50 is configured to detect (Block S110) movement in proximity to the mailbox. In one or more embodiments, mailbox device 18 such as via one or more of processing circuitry 40, processor 42 and communication interface 38 is configured to communicate (Block S112) an indication of the detected movement to premises device 16. In one or more embodiments, premises device 16 and/or mailbox device 18 such as via one or more of triggering unit 32 in processing circuitry 26, processor 28, communication interface 24, information unit 46 in processing circuitry 40, processor 42, communication interface 38, and access control unit 50 is configured to determine (Block S114) if a mailbox event has occurred based upon the indication of the detected movement. In one or more embodiments, premises device 16 and/or mailbox device 18 such as via one or more of triggering unit 32 in processing circuitry 26, processor 28, communication interface 24, information unit 46 in processing circuitry 40, processor 42, communication interface 38, and access control unit 50 is configured to trigger (Block S116) at least one alert if a mailbox event occurred.

In one or more embodiments, opening and closing of the mailbox 14 is detected and if a mailbox event has occurred is determined based upon the detected opening and closing of the mailbox 14. In one or more embodiments, the indication further comprises video captured by the mailbox device 18. In one or more embodiments, the indication further comprises captured video of the exterior of the mailbox 14 and captured video of the interior of the mailbox 14. In one or more embodiments, a person proximate to the mailbox 14 is identified. In one or more embodiments, identifying a person proximate to the mailbox 14 further comprises receiving a wireless signal that identifies the person proximate to the mailbox 14. In one or more embodiments, the method comprises sending an indication to at least one electronic personal voice assistant to provide an audible indication of the at least one alert. In one or more embodiments, the method includes limiting access to an interior of the mailbox 14 to authorized users.

One or more embodiments for communicating sensor information and triggering an alert are further described below.

System 10 may include one or more of the following:

1. A sensor 48 to detect the opening and closure status of a mailbox 14. In some embodiments it is contemplated that the technology behind a traditional door/window sensor can be used to detect an open/close status of the mailbox 14;

2. A radio, e.g., communication interface 38, to wirelessly communicate the open/close status of mailbox 14 to a receiver, e.g., communication interface 24;

3. A receiver (e.g., communication interface 24) which can translate that signal into various communications that integrate with Internet of Things (IoT) and home security and automation systems, such as ADT Pulse, Amazon Alexa, Google Home, etc.; and 4. Optional attachments:
   a. A video camera (e.g., type of sensor 48) which can be affixed to the mailbox 14, that can communicate with the receiver, or additional system run in parallel;
   b. A visual output, such as light, that blinks when the mailbox sensor 48 is opened/closed, or when other conditions are met; and
   c. A microphone (e.g., type of sensor 48) and/or speaker which can be used to communicate with and record evidence of activity at the mailbox 14;

The sensor 48 may be removably affixed to the mailbox 14, can detect the open/close status of a mailbox 14, and relay that signal to a premises device 16 within a home 12 or business, via wireless communication, which can then communicate with an IoT/security and automation system, to trigger a variety of events. The signal can also send notification through mobile applications, such as via push notifications, on cell phones.

The video camera may be able to record video at the mailbox device 18 or communicate that video signal to a server where the video can be stored. This stored video can be used as evidence to identify a burglar and/or solve a crime.

In one or more embodiments, by integrating the system 10 described herein with one or more of these personal voice assistance speakers or other systems, various new functionality may be provided. For instance, when a mailbox has been opened, the user may receive an audible alert in their home through a personal voice assistant speaker: "Your mail has been delivered." Or, the user could receive a mobile notification on their phone: "Your mail has been delivered."

Or, the user could receive a visual alert in their home: "Occupied room lights blink twice when mail has been delivered," for example, or, the user could receive video footage on their phone of the mail delivery person delivering the mail. Further, this may provide notification and video evidence of a criminal stealing parcels from a mailbox.

In addition, by analyzing (e.g., at premises device 16) the frequency and timing of mailbox door openings and closings (e.g., sensor information), the system can determine anomalies, which can then be communicated to the user in one or more formats. The anomalies can signal, for instance, when an unauthorized user has opened the mailbox. For example, if the mail delivery person usually delivers the mail at 12 pm each day, but on a specific day the mailbox was opened twice between 12 pm and 2 pm, the system 10 can determine that someone in addition to the mail delivery person opened the mailbox. By receiving notification of exceptions, users have the knowledge the user needs to act quicker. For example, the user can, for instance, contact the police within seconds of their mailbox 14 contents being tampered with, when otherwise, they could wait several days before they realized a valuable parcel was missing.

The system 10 can also tie in personal authentication, so the system 10 can determine identity, which can provide additional contextual information, to help improve notification and determination of notable events. Identity can be authenticated in a variety of ways, including detecting at mailbox device 18 one or more wireless communication signals such as Near Field Communication (NFC), GPS, and Bluetooth that can be used to identify a user, wireless device, etc. In such a case, the system 10 can determine that a specific individual checked the mail. The system 10 can send a personalized alert through a voice assistant speaker or text message, "Bob (an authorized user) has picked up the mail (no need to go check the mailbox)". Additionally, since the system 10 recognized "Bob", the system 10 can be configured not to send a notification exception that an unauthorized person accessed the mailbox 14.

As an additional method of collecting information (e.g., sensor information), a video camera can be attached to the system 10 to capture video footage. The video camera (e.g., type of sensor 48) can receive a signal to begin capturing video when the mailbox sensor opening is triggered or motion was detected, providing critical video evidence in the case of unauthorized access. The video camera can also offer a "roll back" feature, so video evidence is captured before the open sensor is triggered. The video evidence can then be communicated to the user, providing crucial video evidence needed to reduce crime and theft of personal property.

Figure 5:
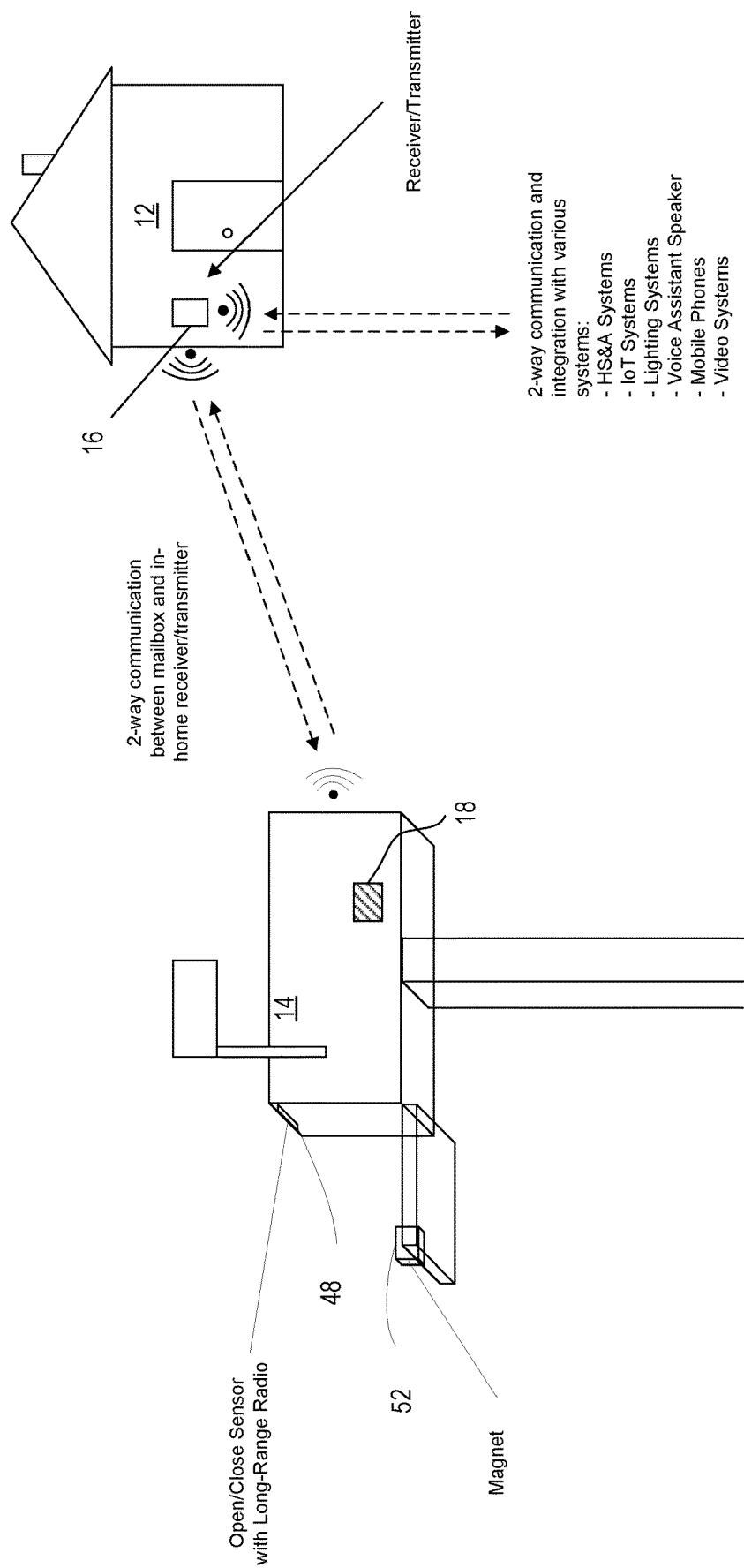
FIG. 5 is a diagram of an example embodiment according to some embodiments of the present invention.
Figure 6:
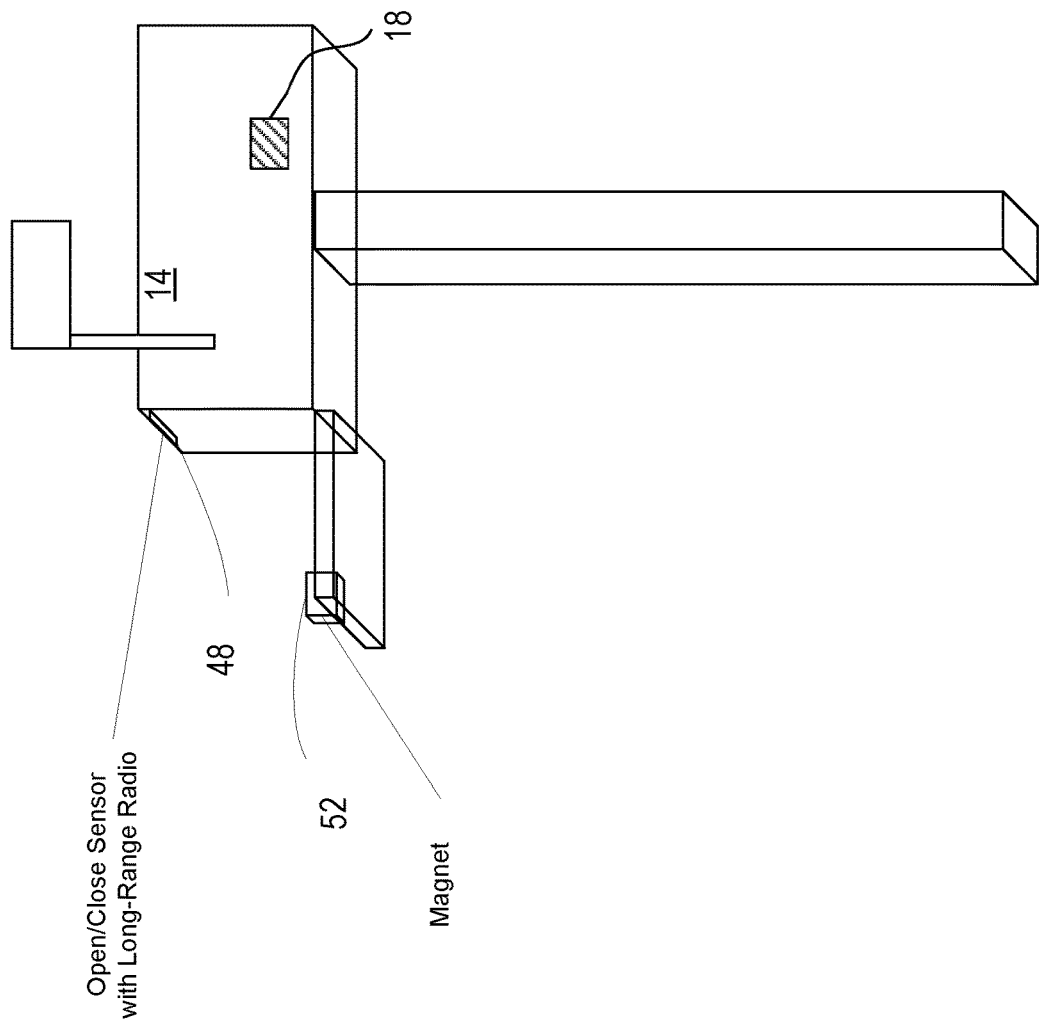
FIG. 6 is a diagram of a detailed view of the mailbox of FIG. 5.

FIG. 5 is an example embodiment of system 10 in accordance with the principles of the invention. In one or more embodiments, mailbox device 18 includes sensors 48 and a triggering element 52 such as a magnet or other type of switch that may be used to detect opening/closing of the mailbox door. In one or more embodiments, mailbox device 18 and premises device 16 are in 2-way communication with each other via respective communication interfaces 24 and 38, that may be in communication with respective transceivers, transmitter and/or receivers at respective devices 16 and 18. In one or more embodiments, premises device 16 is configured to integrate with one or more systems and/or devices such as one or more of home security and automation (HS&A) systems, Internet of Things (IoT) systems, lighting systems, voice assistant speaker, mobile phones and video systems, among other systems located in and/or proximate premises 12. FIG. 6 is an example embodiment of mailbox 14 of FIG. 5 in accordance with the principles of the invention.

Figure 7:
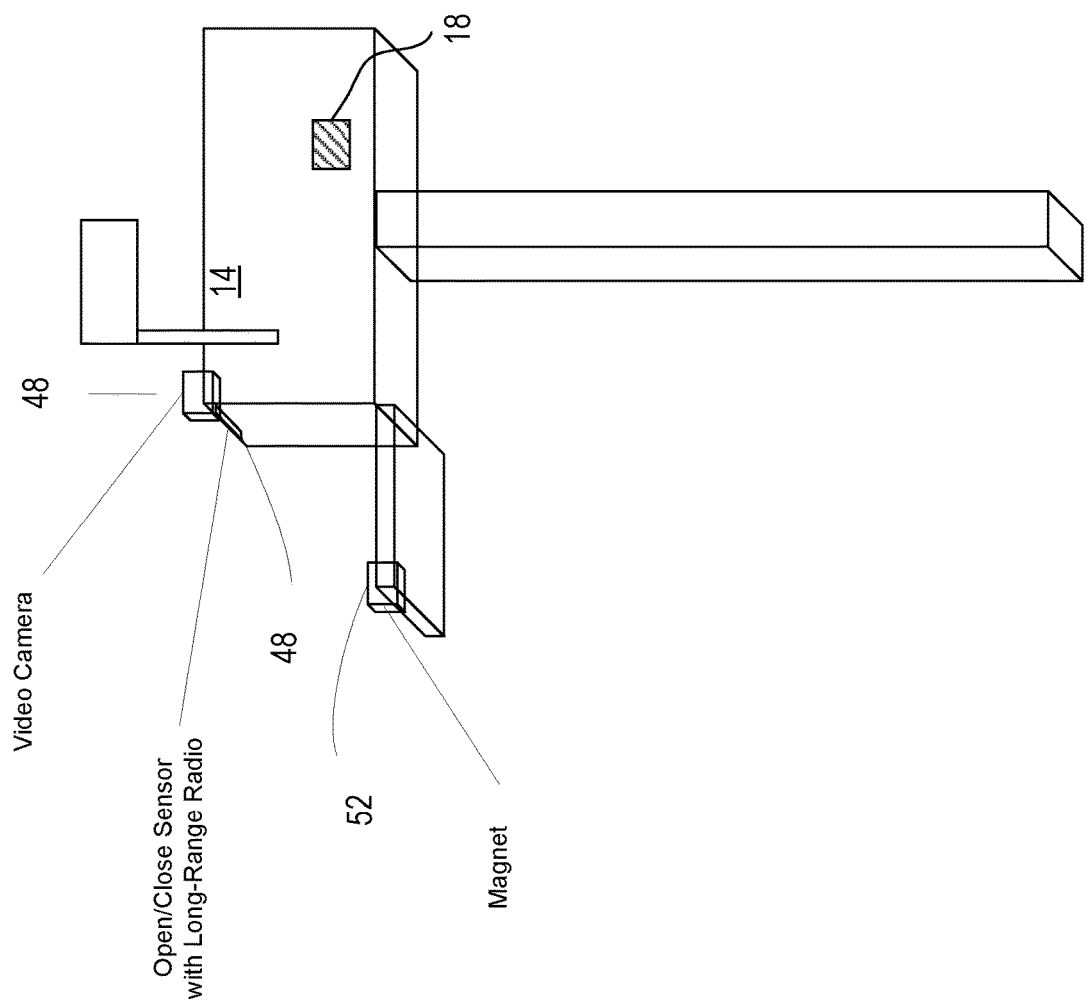
FIG. 7 is a diagram of another example embodiment of the mailbox and mailbox device according to some embodiments of the present invention.

FIG. 7 is another example embodiment of mailbox 14 in accordance with the principles of the invention. In one or more embodiments, sensors 48 may include a video camera (e.g., type of sensor 48) with a field of view of the exterior of mailbox 14. In one or more embodiments, video camera may be configured to capture video if open/close sensor 48 has been triggered such as via separation of open/close sensor 48 and the triggering element 52, e.g., magnet, and/or as triggered by mailbox device 18.

Figure 8:
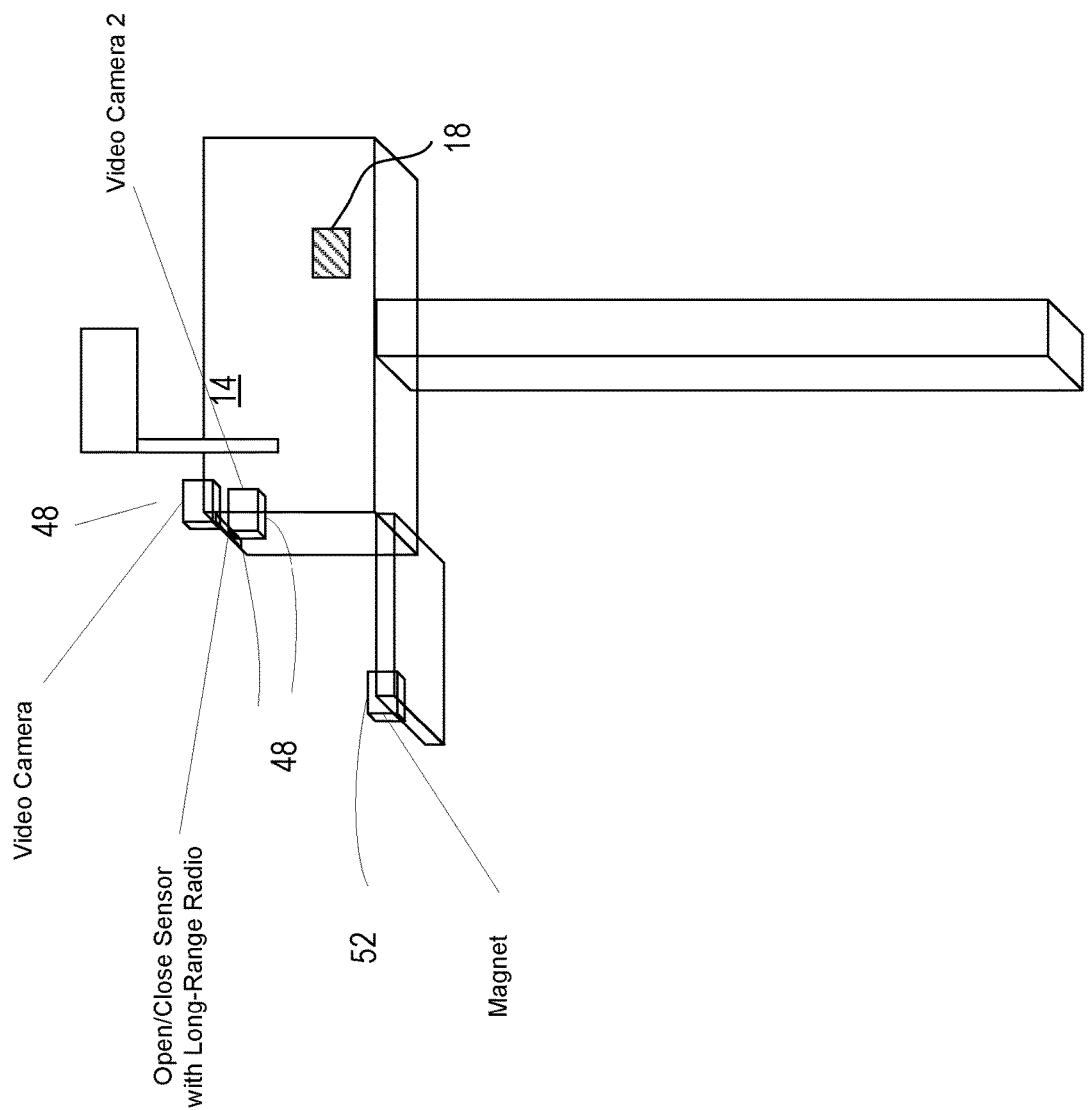
FIG. 8 is a diagram of another example embodiment of the mailbox and mailbox device according to some embodiments of the present invention.
Figure 9:
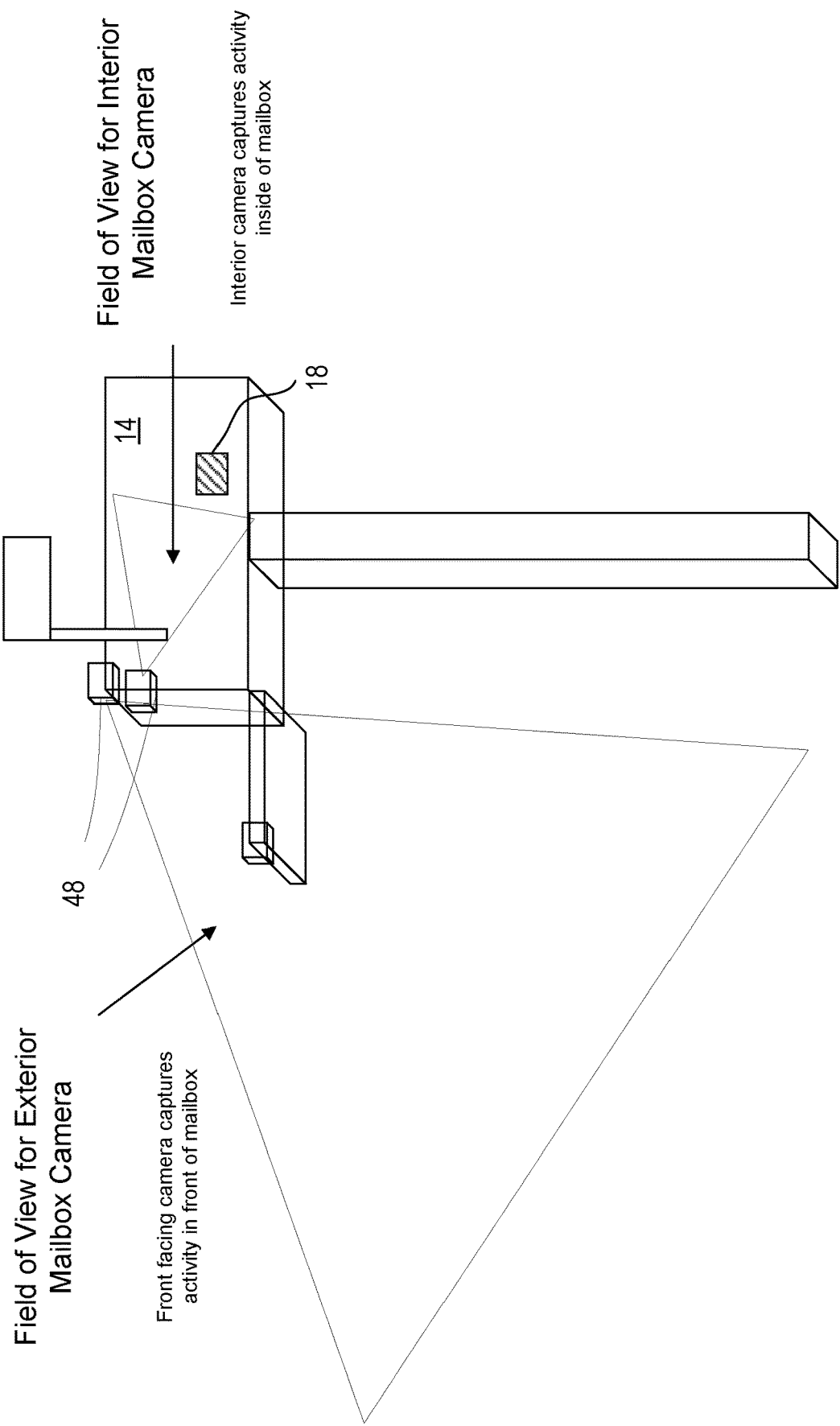
FIG. 9 is a diagram of a detailed view of the fields of view of the sensors of mailbox device according to some embodiments of the present invention.

FIG. 8 is yet another example embodiment of mailbox 14 in accordance with the principles of the invention. FIG. 8 is similar to FIG. 7 except that a second video camera (e.g., sensor 48) is positioned with a field of view of the interior of mailbox 14. The first video camera and/or second video camera may be configured to capture video on the same or different sensor event such as opening of the mailbox door. FIG. 9 is a detailed view of the embodiment of FIG. 8 where the respective field of view is illustrated.

Figure 10:
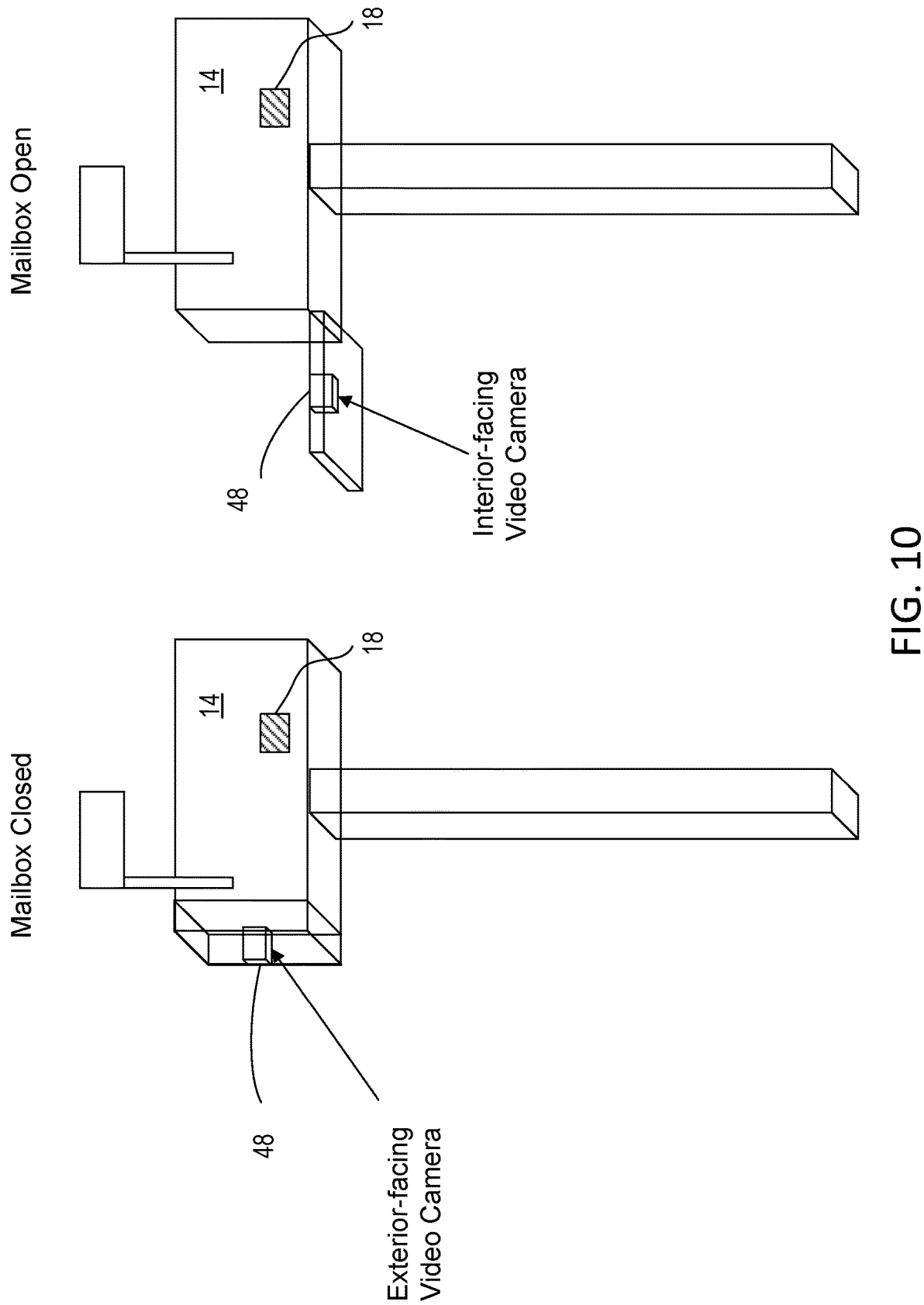
FIG. 10 is a diagram of other example embodiments of the mailbox and mailbox device according to some embodiments of the present invention.
Figure 11:
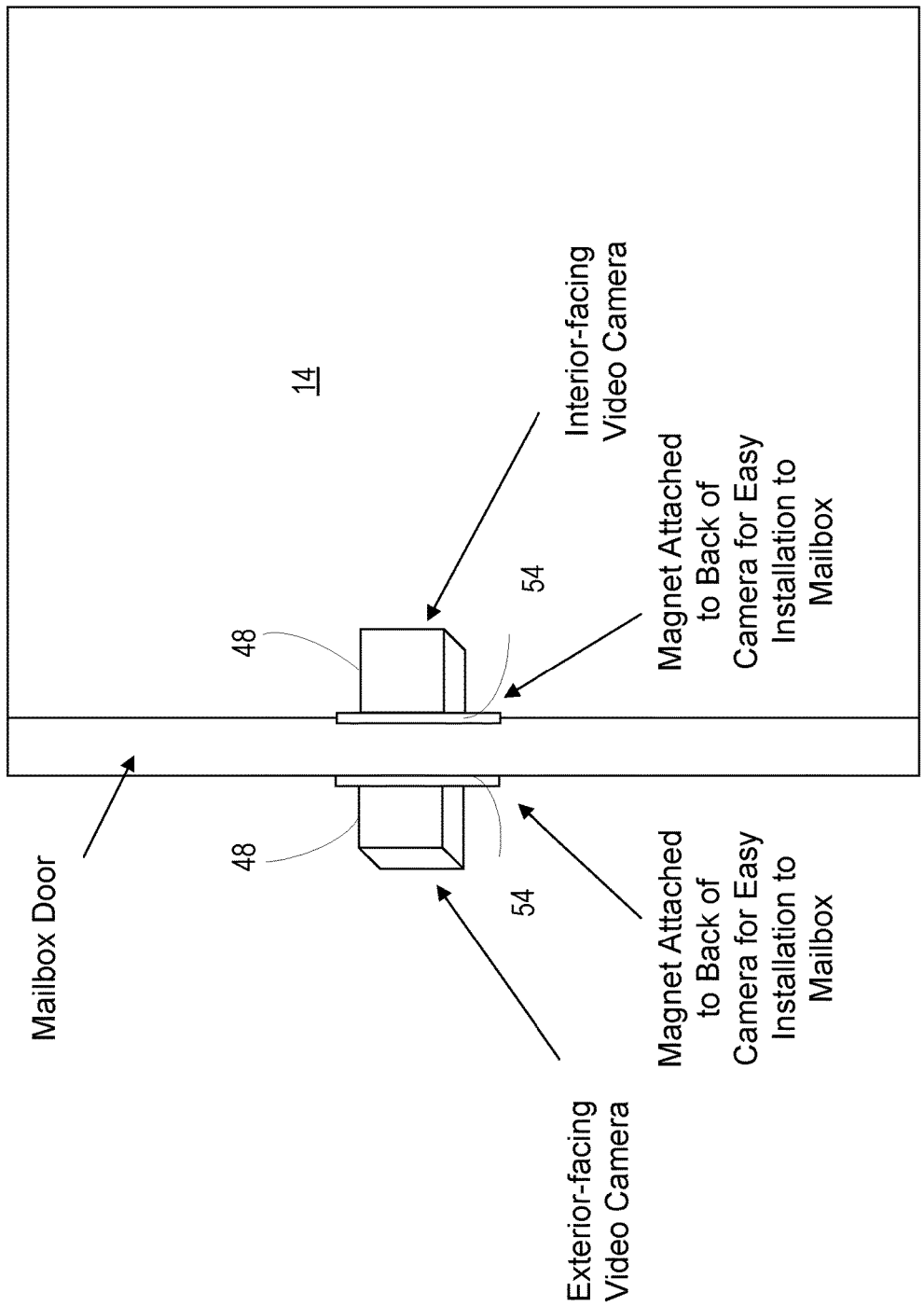
FIG. 11 is a diagram of a detailed view of the sensors of mailbox device according to some embodiments of the prevent invention.

FIG. 10 is yet another example embodiment of mailbox 14 in accordance with the principles of the invention. In one or more embodiments, the video cameras (i.e., sensors 48) are removably attached to door of mailbox 14 as illustrated in FIG. 10 to provide interior or exterior views of the mailbox 14 as desired. The mailboxes of FIG. 10 may include other sensors as described herein. FIG. 11 is a detailed illustration of the configuration of FIG. 10 where, in one or more embodiments, the video cameras are attached to a metal door of the mailbox 14 using an adhesive element 54 such as magnets.

The improved mailbox notification system 10 also provides a convenience feature—giving users improved knowledge of their environment—so that the users can make informed decisions about their mail and mailbox 14. Using system 10, users may no longer have to continuously check their mail, wondering if the mail person has arrived.

In one or more embodiments, with the Application Program Interfaces (APIs) of various systems, the mail notification system 10 could be integrated with delivery organizations, such as the United States Postal Services, UPS, or FedEx, to provide two-way communications about outgoing and incoming mail. Two-way communication between mailboxes 14 (using system 10) and delivery organizations could provide new functionality based on system 10 such as users could notify UPS that their mailbox 14 has a package available for pickup, for example, creating a "secure local pickup" zone at homes and businesses throughout the country. For example, mailbox device 18 may communicate with one or more delivery organizations (i.e., delivery organization server(s)) via premises device 16 such that mailbox device may transmit and/or receive data/information related to mail/package/article delivery. Similarly, premises device 16 may transmit and/or receive the information described above to/from the delivery organization(s) and/or other entities. In one example, a UPS delivery service server may notify premises device 16 that a package is expected to be delivered on a predefined day such that premises device 16 may determine whether the package was received based on sensor data received from mailbox device 18. In another example, premises device 16 may receive a notification from a delivery organization server that a package was delivered at a specific time. In this case, premises device 16 may analyze the sensors data at and/or around the specific time indicated in the notification to determine if a package has been received. The notification may include various information that may be used for comparison to the sensor 48 data such as dimensions, shape, color, etc. of the package, delivered location of the package (e.g., front door, next to mailbox, inside mailbox, etc.), among other information that can be used in one or more rules for analysis of sensor data. The communication protocol(s) used for communication between mailbox device 18 and premises device 16 may be different than the communication protocol(s) used between the premises device 16 and one or more delivery organizations.

FIG. 12 is a diagram of another example embodiment of the mailbox 14 and mailbox device 18 having an access control unit 50 according to some embodiments of the present invention. In the shown embodiment, an access control unit 50 is affixed to the mailbox 14 which controls access and grants entry to authorized persons. The access control unit 50 may include a locking device that may be securely attached to the mailbox 14 via a fastener, which can be in the form of screws, adhesive, or magnets, etc. Once the locking device is attached to the mailbox 14, the mailbox 14 door's open/close state may be restricted so that only authorized persons are able to open the mailbox 14. The locking device, or "lock", may be in the form of a mechanical lock, electro-magnetic lock, or other locking mechanism in various embodiments. Mechanical locks are mechanical devices which secure an opening by keeping a door closed until a release mechanism is activated, usually a lever, knob, or key. An electromagnetic lock, magnetic lock, or maglock is a locking device that consists of an electromagnet and an armature plate. Typically, the electromagnet portion of the lock is attached to the door frame and a mating armature plate is attached to the door. The two components may be in contact when the door is closed. When the electromagnet is energized, a current passing through the electromagnet creates a magnetic flux that causes the armature plate to attract to the electromagnet, creating a locking action. Because the mating area of the electromagnet and armature may be relatively large, the force created by the magnetic flux may be strong enough to keep the door locked even under stress.

In an embodiment, the end user may be able to grant/revoke access to the mailbox 14 via a web, mobile application, or other interface. Within the interface, the user may be able to add/revoke permissions for a specific person or group of people and may be able to select the types of access methods authorized for entry into that specific mailbox 14. A variety of methods can be used by access control unit 50 to lock/unlock the mailbox 14, determine identity of the person(s) who is trying to access the mailbox, and grant access to the mailbox.

In an embodiment, the end-user may be able to lock/unlock the mailbox 14 in real-time from a mobile application, web portal, voice assistant, or other interface. In an embodiment, a physical key may be used to disengage the lock. In an embodiment, an ID card may be scanned at the mailbox 14 to open it. In an embodiment, a sensor 48 is a video camera attached to the mailbox 14 in which the video camera (or other computing device) may determine identity based on facial recognition or other image analyses, sending an "open" command to the access control unit 50 if/when an authorized person's face is detected, or an authorized image is detected, for example.

In an embodiment, the sensor 48 is a video camera attached to the mailbox device 18, and may detect an identifier such as the USPS logo on the side of a mail truck, video analytics may then determine a delivery person has arrived, and then the lock may automatically disengage if the end-used granted authorization via this access type (image analysis entry).

In an embodiment, geo-fencing services may be used to track the location of the person needing access. Once the person has reached a pre-determined distance from the mailbox 14, the locking device of access control unit 50 may automatically disengage.

Near-field communication (NFC) may be utilized in accordance with an embodiment. Devices which utilize NFC may provide identity authentication and unlock the mailbox 14 door. A variety of devices have NFC-functionality already built in, including cell phones, tablets, smart watches, and vehicles, etc.

In an embodiment, other wireless communication technology, such as Bluetooth or Wi-Fi, may be used for longer-range identity authentication.

In an embodiment, the lock of access control unit 50 can be set to lock/unlock at specific times of the day, specific intervals, or specific days of the week.

In an embodiment, other biometric authorization types can be used to verify identity, including fingerprint scanning, palm reading (vein recognition), voice analysis, iris recognition, etc.

While authorized users may be granted access to the mailbox 14, the detection of unauthorized users attempting to open a mailbox, tamper with a mailbox, steal a mailbox, or loiter around a mailbox, may trigger a variety of responses and deterrent effects. If someone tries to open a mailbox 14 but they lack access due to any of the aforementioned authentication methods and/or access control unit 50, that may be assumed to constitute detection of tampering or attempted unauthorized access. Additionally, if the mailbox 14 is moved or the sensor 48, e.g., video camera, determines an unauthorized person is loitering around the mailbox, that may also be assumed to constitute tampering or detection of unauthorized access. If an unauthorized user is detected tampering with or trying to access the mailbox 14, some or all the following actions may result.

In an embodiment, a notification of the event may be sent to the end user's phone, e-mail address, personal voice assistant, etc. Along with the notification, a video clip, audio clip, or other contextual information may be shared with the end user, or others, so they can take appropriate action.

In an embodiment, if elected by the end user, a notification, for example by system 10, may be sent to a professional monitoring company or directly to the police, which may lead to a quicker response and higher likelihood of apprehending a suspect.

In an embodiment, a siren located in the mailbox security system 10 may sound. If a siren is also located in the user's home or business 12, and the mailbox system 10 is integrated with the home or business's security system, the home or business siren may sound. Additionally, if the mailbox system 10 is integrated with the home or business's security and automation system, other actions may be triggered, for example, outside flood lights may turn on or outside security cameras may begin recording video if an unauthorized access attempt is detected.

In an embodiment, a pre-recorded audio message may play through a speaker. For example, a "An unauthorized attempt to access this mailbox has been detected. Please step away from the mailbox. Authorities have been notified", message may be produced by the speaker.

In an embodiment, a strobe light attached to the mailbox 14, or attached to the home or business 12, may be triggered, providing a visual warning that an unauthorized access attempt was detected.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module". Any process, step, action and/or functionality described herein may be performed by, and/or associated to, a corresponding module, which may be implemented in software and/or firmware and/or hardware. Furthermore, the invention may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims

What is claimed is:

1. A premises security system for monitoring a mailbox, the premises security system comprising:
   a mailbox device including:
      at least one sensor, each of the at least one sensor configured to generate corresponding sensor information;
      a mailbox communication interface configured to communicate information including the sensor information generated by the at least one sensor; and
   a premises device in communication with the mailbox device, the premises device including:
      a premises communication interface configured to receive the sensor information from the mailbox device; and
      processing circuitry configured to:
         determine, based on mailbox alert criteria whether a mailbox event has occurred by analyzing a frequency and timing of mailbox openings and closings detected by the at least one sensor; and
         trigger at least one response action based at least in part on whether the mailbox event has occurred.

2. The premises security system of claim 1, wherein the mailbox device further includes at least one video capture device, the sensor information communicated to the premises device including video captured by the at least one video capture device.

3. The premises security system of claim 2, wherein the at least one video capture device includes a first video capture device configured to capture video of an exterior of the mailbox and a second video capture device configured to capture video of an interior of the mailbox.

4. The premises security system of claim 1, wherein the mailbox communication interface is further configured to receive wireless signals for identifying a person proximate to the mailbox.

5. The premises security system of claim 4, wherein the wireless signals are at least one of near field communication signals, global positioning signals and BLUETOOTH signals.

6. The premises security system of claim 1, wherein the premises device is configured to integrate with at least an electronic personal voice assistant for providing an audible indication of the at least one response action, the at least one response action being an alert.

7. The premises security system of claim 1, further comprising an access control unit affixed to the mailbox which limits access to the mailbox.

8. A mailbox device for monitoring a mailbox, the mailbox device comprising:
    at least one sensor, the at least one sensor configured to detect at least one action associated with the mailbox and generate corresponding sensor information; and
    at least one optical device configured to capture optical information in a response to the sensor information of the at least one sensor; and
    a mailbox communication interface configured to communicate information including the sensor information generated by the at least one sensor; and
    processing circuitry in communication with at least one of the at least one sensor and the at least one optical device, the processing circuitry configured to:
        determine whether a mailbox event has occurred by analyzing a frequency and timing of the at least one action associated with the mailbox detected by the at least one sensor, the at least one action being any one of an opening and a closing of the mailbox; and
        trigger at least one response action based at least in part on whether the mailbox event has occurred.

9. The mailbox device of claim 8, wherein the at least one optical device includes a first video capture device configured to capture video of an exterior of the mailbox and a second video capture device configured to capture video of an interior of the mailbox.

10. The mailbox device of claim 8, wherein the mailbox communication interface is further configured to receive wireless signals for identifying a person proximate to the mailbox, the wireless signals including at least one of near field communication signals, global positioning signals and BLUETOOTH signals.

11. The mailbox device of claim 8, wherein the mailbox device is configured to integrate with at least one electronic personal voice assistant for providing an audible indication of the at least one response action, the mailbox device further including an access control unit affixed to the mailbox which limits access to the mailbox.

12. A method of monitoring a mailbox, the method comprising:
    detecting an action associated with the mailbox;
    communicating an indication of the detected action to a premises device;
    determining whether a mailbox event has occurred based at least in part on:
        the indication of the detected action; and
        analysis of a frequency and timing of mailbox openings and closings; and
    triggering at least one response action based at least in part on whether the mailbox event has occurred.

13. The method of claim 12, wherein the detected action associated with the mailbox is anyone of a movement in proximity to the mailbox, an opening of the mailbox, and a closing of the mailbox.

14. The method of claim 12, wherein the indication further comprises video captured by a mailbox device.

15. The method of claim 12, wherein the indication further comprises captured video of an exterior of the mailbox and captured video of an interior of the mailbox.

16. The method of claim 12, wherein detecting the action associated with the mailbox includes identifying a person proximate to the mailbox.

17. The method of claim 12, wherein identifying a person proximate to the mailbox further comprises receiving a wireless signal that identifies the person proximate to the mailbox.

18. The method of claim 12, further comprising:
    sending another indication to at least one electronic personal voice assistant to provide an audible indication of the at least one response action; and
    limiting access to an interior of the mailbox to authorized users.

* * * * *